United States Patent [19]

Weishaupt et al.

[11] Patent Number: 4,652,860

[45] Date of Patent: Mar. 24, 1987

[54] SECURITY INSTALLATION

[75] Inventors: Walter Weishaupt, Munich; Michael Tigges, Freising; Arnost Proske, Emmering, all of Fed. Rep. of Germany

[73] Assignee: Bayerische Motoren Werke Aktiengesellschaft, Fed. Rep. of Germany

[21] Appl. No.: 539,960

[22] Filed: Oct. 7, 1983

[30] Foreign Application Priority Data

Oct. 11, 1982 [DE] Fed. Rep. of Germany ....... 3237622

[51] Int. Cl.[4] .......................... G08B 1/08; H04Q 7/00

[52] U.S. Cl. .................................... 340/539; 340/543; 340/63; 340/825.69; 340/825.22; 340/825.31; 340/825.5; 180/287; 361/171; 455/92

[58] Field of Search ............... 340/539, 534, 535, 542, 340/543, 825.44, 825.5, 63, 64, 825.69, 825.72, 825.22, 696, 825.31; 180/167, 287; 361/171, 172; 455/151, 92

[56] References Cited

U.S. PATENT DOCUMENTS

| | | | |
|---|---|---|---|
| 4,143,368 | 3/1979 | Route et al. | 340/543 |
| 4,354,189 | 10/1982 | Lemelson | 340/543 |
| 4,360,801 | 11/1982 | Duhame | 340/506 |
| 4,383,242 | 5/1983 | Sassover et al. | 340/539 |
| 4,422,071 | 12/1983 | deGraaf | 340/825.44 |
| 4,535,333 | 8/1985 | Twardowski | 340/825.69 |

*Primary Examiner*—Donnie L. Crosland
*Attorney, Agent, or Firm*—Barnes & Thornburg

[57] ABSTRACT

A security installation with a portable transmitter and a receiver arranged at the object to be protected for an IR, respectively, UHF code signal which is changeable at least in part; alone the code signal of the transmitter can be changed upon random command and can be written into the associated storage device of the transmitter.

9 Claims, 4 Drawing Figures

SECURITY INSTALLATION

The present invention relates to a security installation, especially as door-locking and theft protection in a motor vehicle, with a portable transmitter and a receiver arranged at the object to be protected for a code signal which is changeable at least in part, and with a code signal storage device in the transmitter and in the receiver.

In a locking installation of a known safety installation of this type (compare German Offenlegungsschrift 30 06 128), the change of the code signal takes place in conjunction with the safety function, properly speaking, for example, when during agreement of the code signals of transmitter and receiver, a switching signal is produced for opening the locking installation. The reprogramming of both transmitter and receiver in unison takes place in each case automatically either with each such switching signal or after a predetermined number of such switching signals. The problem results therefrom that the use of the security installation with the aid of a second transmitter is not possible or is possible only with considerable difficulties. By reason of the electronic, non-mechanical generation of the code signal, for example, in the form of a pulse code transmitted by UHF or IR, it cannot be recognized externally which code signal exists, respectively, whether the code signal has been changed compared to a prior use of the security installation.

The present invention is concerned with the task to provide a security system of the aforementioned type which preserves the possibility to change the code signal but which can also be operated without difficulty with the aid of a second transmitter.

The underlying problems are solved according to the present invention in that exclusively the code signal of the transmitter is changeable upon a command at will and is adapted to be stored or written into the associated storage device.

The random change of the code signal offers the possibility to furnish also the second transmitter with the respectively valid code signal. This may be realized, for example, in the manner as will be described more fully hereinafter. The code signal has to be recorded in or written into the storage device of the second transmitter only when it has been changed for the first transmitter. This change, however, is known as such since it is undertaken consciously by the owner of the first transmitter.

The code signal can then be changed in different ways. A particularly simple form consists in giving the command for changing the code signal by a switch which is located at the housing of the associated transmitter.

The code signal, in its turn, can be produced in different ways. Thus, a code signal generator may be provided inside of the one transmitter housing, which is activated upon actuation of the switch. The code signal generator may be, for example, a random generator or a pseudo-random generator. The latter can be realized, for example, alone by a counter with a high cyclic frequency whose duration of engagement is determined by the switch and comes to rest at a value determined by the duration of actuation of the switch. Such a generator is known in principle also from the German Offenlegungsschrift No. 30 06 128. As an alternative thereto, the switch may also activate the writing input of the code signal storage device, to which is applied the changed code signal. This changed code signal may be transmitted, for example, by another transmitter with a code signal generator. It is possible in this manner to provide only one such transmitter which produces the respectively valid Ur code signal and transmits the same to the other transmitters in the described manner.

Also a programming part may serve as code signal generator which, for example, is a coding rod or a coding disk and is adapted to be inserted into the housing of the transmitter, respectively, rotatable therein. With the aid of the programming part whose condition can be selected, for example, manually, the code signal corresponding to the condition of the programming part can now be detected inside of the transmitter housing and can be written into the associated storage device. For changing the code signal of a second transmitter, the programming part can also be inserted into the housing thereof and can be detected thereat in the same manner.

This changing of the code signal with the aid of another transmitter can be realized in a particularly simple manner in that the transmitter element, properly speaking, of the transmitter is used as receiving element. This is quite possible with a corresponding small distance of the two transmitters. In the case of a UHF signal, this possibility is known as such since each antenna also acts as transmitter element.

However, it is now also possible to realize the same measure with an IR (infra-red) code signal. If one utilizes a diode as IR transmitter element, then the same also acts as receiver and with a large input power supplies an output signal with a sufficiently high level. The imprinting of a new code signal can be assured thereby in that the transmitter housing has a shape which is complementary to the shape of the other transmitter radiating the valid code signal.

These and other objects, features and advantages of the present invention will become more apparent from the following description when taken in connection with the accompanying drawing which shows, for purposes of illustration only, two embodiments in accordance with the present invention, and wherein.

Figure 1:
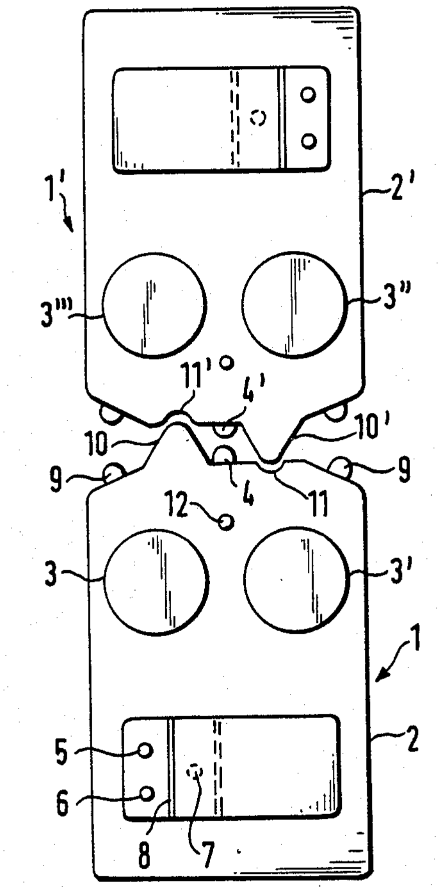
FIG. 1 is a somewhat schematic elevational view of two identical programmable IR transmitters for a code signal within the scope of a security system in accordance with the present invention.

Referring now to the drawing wherein like reference numerals are used throughout the four views to designate like parts, a safety or security installation in the form of a locking mechanism 24 (shown in FIG. 4) for a motor vehicle, not illustrated in detail, includes a transmitter 1 (shown in FIG. 1) whose housing 2 includes several push buttons. They are the push buttons 3 and 3' for transmitting a code signal contained in a storage device 17 with the aid of an IR-diode 4 for opening, respectively, closing the locking mechanism as well as further push buttons 5, 6 and 7, with the aid of which a new code signal is adapted to be written into the storage device. The housing 2 further includes two further IR diodes 9 which are located in proximity of the diode 4 and transmit laterally an interference signal as is described in the German Patent Application No. P 31 49 259.2, corresponding to U.S. application Ser. No. 452,031, filed on Dec. 22, 1982 and entitled "Anti-Theft Apparatus for Vehicles", the subject matter of which is incorporated herein by reference.

Figure 4:
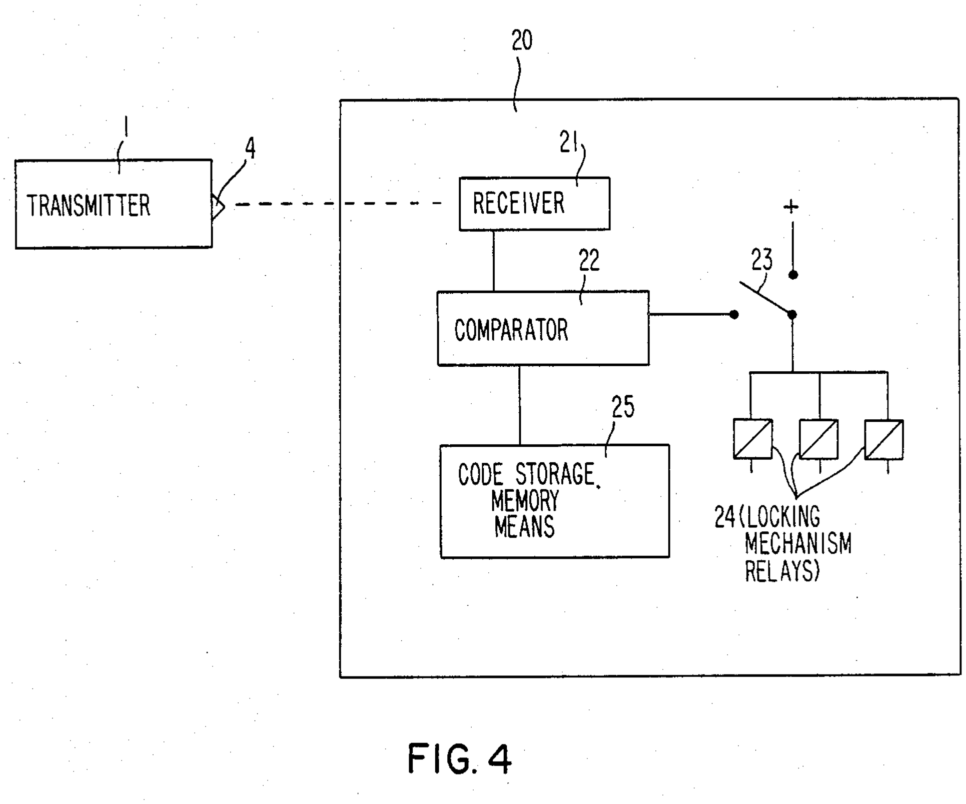
FIG. 4 is a schematic showing of a transmitter and automobile lock actuation mechanism.

FIG. 4 shows transmitter 1 of the instant device as it is utilized in U.S. application Ser. No. 452,031 to send out a signal 19 from transmitter 4 which is accepted by receiver 21 in a vehicle 20. Signal 19 is compared in a comparator 22 with a preset signal in memory 25 and if the signals are the same, switch 23 is closed which causes actuation of the locking mechanism relays 24 of the vehicle 20.

The push buttons 6 or 7 which are freed after pushing back a cover 8 into the first, respectively, second detent position, enable to change one of the two changeable parts of the code signal. If the push button 6 is actuated, then only the so-called change code is changed, whereas with actuation of the push button 7 the so-called owner code is changed correspnding to a generated new code signal. The differentiation between change and owner code and the particular type of their change is disclosed in the German Auslegeschrift No. 29 28 913, the subject matter of which is also incorporated herein by reference. The generation of one of the two partial codes takes place in such a manner that upon depressing of the push button 6 or 7, a rapidly running counter contained in the housing 2 is started and is stopped with the release of the push button. The actual counter condition is written into the storage device as new change, respectively, owner code.

After the actuation of the push button 5, a new code signal consisting of change and owner code can be written into the storage device. If a corresponding code signal exists at the transmitter 1, then the same is received with the aid of the diode 4 which also acts as receiver. For that purpose, for example, a second transmitter 1′ corresponding in its construction to the transmitter 1 is placed opposite the transmitter 1 in such a manner that the diode 4 thereof corresponding to the transmitter diode 4′ is disposed accurately opposite the same and the code signal thereof is transmitted or radiated by actuation of the corresponding push button 3″ or 3‴. As a result of a complementary configuration of the housing 2, respectively, 2′, of the transmitters 1, respectively 1′ in the form of cams or projections 10, respectively, 10′ and recesses 11, respectively, 11′, the orientation of the transmitters 1 and 1′ to each other is facilitated. Furthermore, a light diode 12 is provided in the housing 2 which serves as operating assist. It lights up if the stored code signal is transmitted by means of the push buttons 3, respectively, 3′, respectively, if after depressing the push button 5 an externally transmitted new code signal has been stored.

It is possible in this manner to change at will only the code signal of the transmitter 1. This takes place independently of the change of the code signal in the storage device of a receiver 25 connected with the object to be secured. The random change alone of the code signal for the transmitter offers the advantage that it has to be undertaken only when the code signal determinative for the safety installation is changed. The determinative code signal can be impressed without difficulty on a second transmitter as, for example, one the illustrated transmitter 1. Furthermore, errors which occur in the storage device of the transmitter during the reception of the code signal, are without grave influence on the function of the security installation. Such an error can be obviated by a renewed write-in of the determinative code signal into the storage device of the transmitter 1. If, in contrast, the recoding of the transmitter and receiver takes place at the same time, then such an error leads to a discrepancy of the code signal of transmitter and receiver. The consequence is that the security installation is inoperative, respectively, non-useable.

Figure 2:
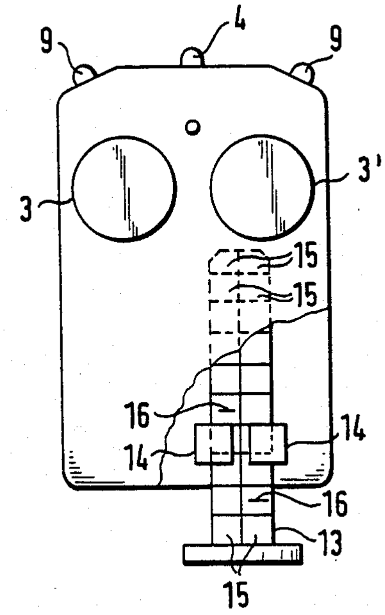
FIG. 2 is a somewhat schematic elevational view of a modified embodiment of a transmitter for a code signal within the scope of a security system in accordance with the present invention.
Figure 3:
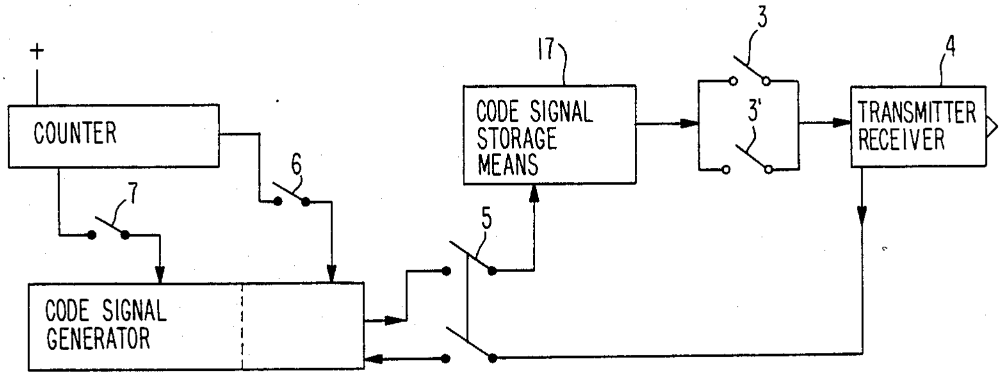
FIG. 3 is a schematic diagram of the transmitter shown in FIG. 1.

FIG. 2 illustrates an alternative for the code signal generation. In that embodiment, the input of a new code signal into the storage device of the transmitter 1 takes place with the aid of a code rod 13 that is adapted to be inserted into the housing 2. Two transillumination light barriers 14 are in the housing 2 which, during the insertion of the code rod 13, detect the code information arranged one behind the other and determining the code signal. These informations are located on ten double-fields 15 disposed one behind the other which can be provided differently with an eraseable line marking 16.

It is also possible with the code rod 13 of FIG. 2 to reprogram a transmitter 1 independently of the receiver, respectively, to transmit the code signal of one transmitter to a second transmitter.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A security installation, especially as door-locking or theft protection of a motor vehicle, comprising plural portable transmitter means and a receiver means for a code signal arranged at the object to be secured, said code signal being changeable at least in part, and code signal storage means in each of the plural transmitter means and receiver means, characterized in that the code signal of a first of the plural transmitter means is changeable at will upon command and is operable to be written into its associated storage means and said first of the plural transmitting means being operable upon instruction to change the code signal stored in another transmitter signal storage means to the code signal stored in said first transmitter associated storage means.

2. An installation according to claim 1, characterized by a switch means for giving the command for changing the code signal.

3. An installation according to claim 2, characterized in that the switch means activates a code signal generator means in the first transmitter means.

4. An installation according to claim 3, characterized in that the switch means includes at least one push button.

5. An installation according to claim 2, characterized in that a second switch means activates the code signal storage means in said other transmitter means for receiving the code signal transmitted by the first transmitter means.

6. An installation according to claim 5, characterized in that the other transmitter means includes a transmitting element which also serves simultaneously as code signal receiver for the first transmitter means.

7. An installation according to claim 6, characterized in that the transmitting element is a diode which transmits an IR code signal.

8. An installation according to claim 1, characterized in that the command is given by a removable part of the first transmitter means which is adapted to be inserted into the housing means of the other transmitter means and contains a changeable programming.

9. An installation according to claim 8, characterized in that the removable part is a coding rod.

* * * * *